T. A. GARRETT & W. LUCAS.
APPARATUS FOR RECEIVING SUBMARINE SOUNDS.
APPLICATION FILED AUG. 31, 1909.
942,897.
Patented Dec. 14, 1909.
3 SHEETS—SHEET 3.
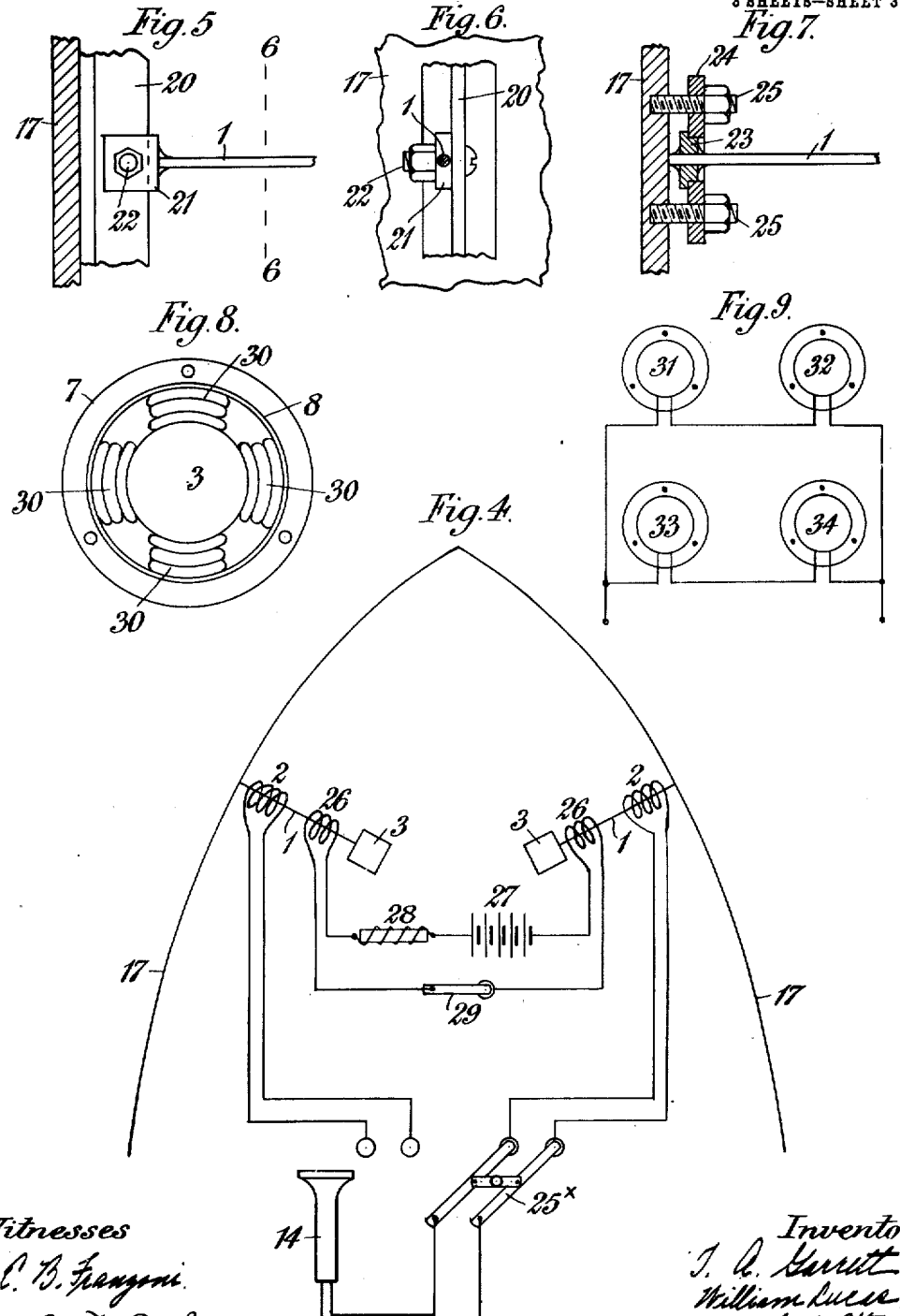

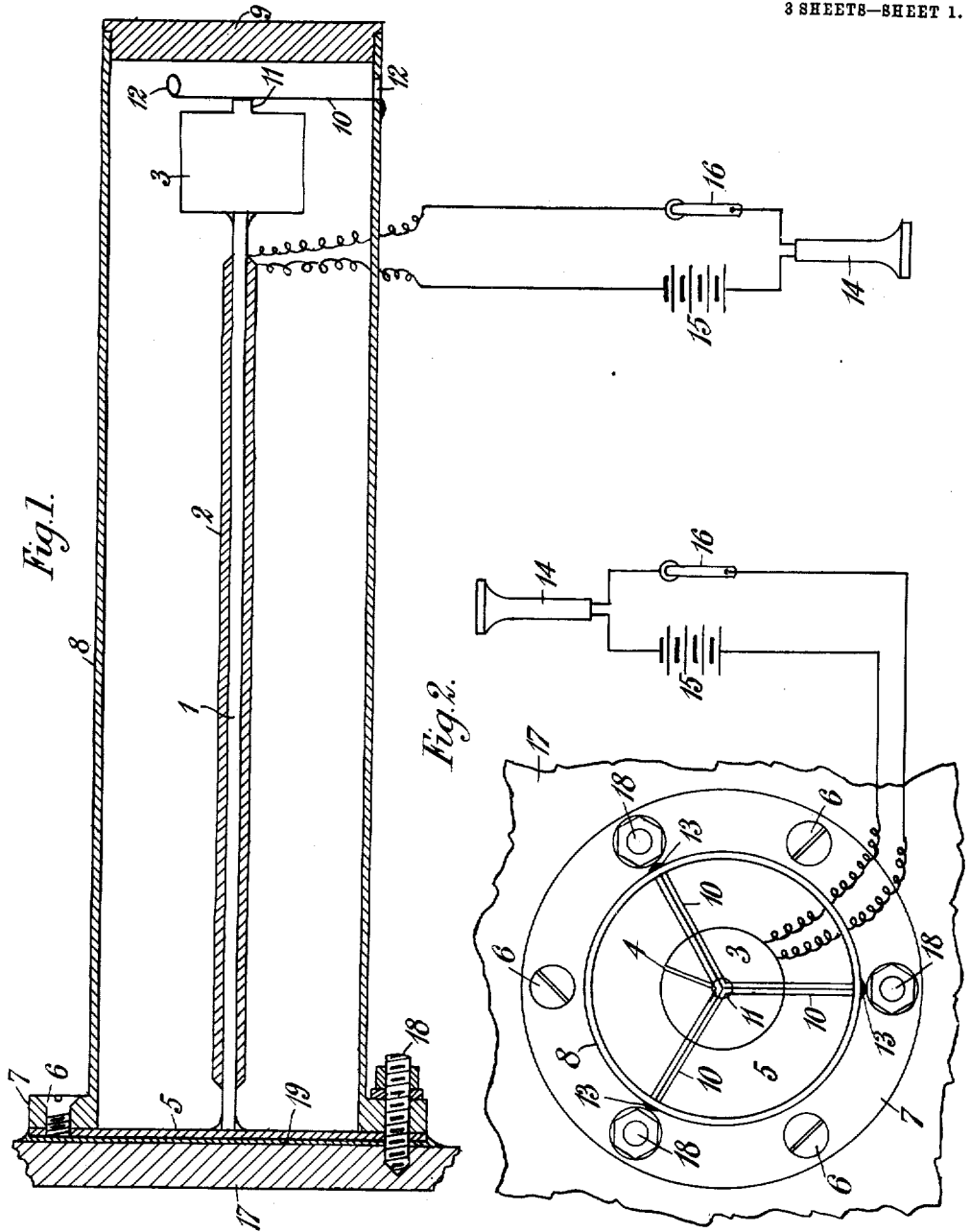

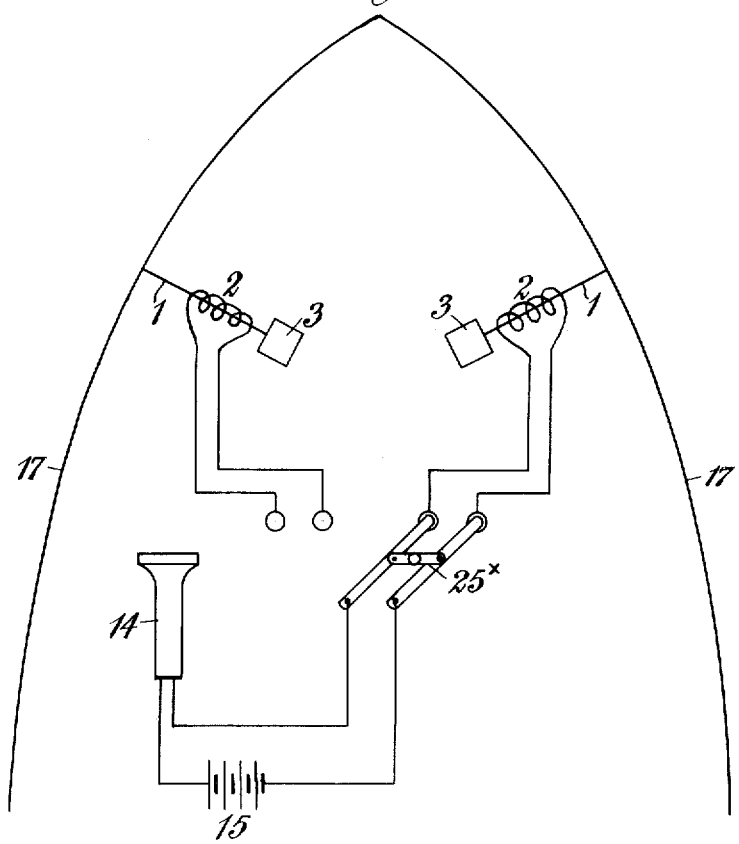

UNITED STATES PATENT OFFICE.

THOMAS ALEXANDER GARRETT, OF REIGATE, AND WILLIAM LUCAS, OF CROUCH END, ENGLAND.

APPARATUS FOR RECEIVING SUBMARINE SOUNDS.

942,897.

Specification of Letters Patent.  Patented Dec. 14, 1909.

Application filed August 31, 1909. Serial No. 515,439.

*To all whom it may concern:*

Be it known that we, THOMAS ALEXANDER GARRETT, engineer, and WILLIAM LUCAS, teacher, subjects of the King of Great Britain, residing, respectively, at "Sunnymead," Reigate Road, Reigate, in the county of Surrey, England, and at 25 Glasslyn road, Crouch End, in the county of Middlesex, England, have invented new and useful Improvements in Apparatus for Receiving Submarine Sounds, of which the following is a specification.

Carbon microphone transmitters which are used in vessels or ships for the reception of sound vibrations from the surrounding water are liable to changes in sensitiveness. Various more or less successful modifications of carbon transmitters have been made with the object of getting rid of this defect. It is especially important to get rid of this defect when transmitters are placed at each side of the vessel and the direction of the source of the sound vibrations is determined by comparing the intensities of the sounds transmitted by the transmitters at the two sides to a receiving telephone or telephones. In such a case a variation in the relative sensitiveness of the transmitters may cause an error in the determination of the direction of the source of sound.

The object of our invention is to provide transmitters of submarine sound vibrations which are less liable to changes in their sensitiveness than are those carbon transmitters which have been hitherto employed. We make use of the well known fact that subjecting a longitudinally magnetized nickel rod or wire to variations of longitudinal stress causes variations in its magnetization and consequently causes variations of electric current in a coil of insulated wire around the rod or wire. Instead of nickel we may employ any other magnetic material in which variations of stress cause variations in magnetization although we find that nickel gives the best results.

In our invention the transmitter substantially consists of a coil of insulated wire surrounding a nickel rod. The term rod in this specification includes a wire or strip or a bundle of wires or strips. To one end of this nickel rod a mass is attached in order to increase the variations of stress in the rod when the other end is subjected to sound vibrations communicated through the side of the vessel from the surrounding water. The variations of electric current which are produced in the coil of wire in consequence of these variations of stress are retranslated into sound by means of a receiving telephone. If a great mass is employed this object is attained by impeding the movement of the end of the rod but preferably when it is desired to receive sound vibrations which have some particular frequency we so proportion the magnitude of the mass and the length and area of cross section of the rod that the system is resonant or nearly resonant to sound vibrations of this frequency because we have found by experiment that by so doing the intensity of the sound in the receiving telephone or telephones is increased. This increases instead of diminishes the movement of the end of the rod but the effect is similar in that variations of stress are increased. When the mass is made of electrically conducting material it may be radially slotted to lessen the eddy currents induced in it by the changes in the magnetization of the rod. When the rod is too flexible to support by itself the mass in the desired position the mass may be further supported by felt or other sound insulating material or by fine flexible wires at right angles to the rod or in any other way which lessens the transmission of sound vibrations which would cause changes of stress in the rod. When the system is resonant the supports should be of such a kind that the free vibration of the system in the direction of the stress variations in the rod may be little restrained or damped by them. Good acoustical connection between the inner surface of the side of the vessel and the end of the rod may be secured by attaching a plate or disk to the rod and bolting the disk to the side of the vessel. This acoustical connection is improved by squeezing a plastic material such as a mixture of pitch and castor oil or other suitable viscous substance between the disk and the vessel's side. By these means we not only obtain better acoustic connection but we insure equal connections on the two sides of the ship.

We prefer that a nickel rod should have been heated to a bright red heat (and allowed to cool) as when it has been so treated the variations in its magnetization caused by the variations of stress are increased and consequently the intensity of the sound heard is increased.

As is now commonly the practice one transmitter is usually placed at one side of the vessel and another similar transmitter at the other side and according to our invention the rods in these are magnetized equally as nearly as may be in order that the two transmitters may be equally sensitive. The nickel rods in the two transmitters may be equally magnetized in various ways. Sometimes we magnetize them equally by means of similar magnetizing coils connected in series with each other a battery and a choking coil. This choking coil is of such inductance as to so much lessen the variable current produced in the magnetizing coil of either transmitter by the variations of stress in the nickel rod in the magnetizing coil of the other transmitter, that sounds received by the transmitter at one side of the vessel shall not be heard in the receiving telephone when it is connected with the transmitter at the other side of the vessel.

When for any reason it is desired to use a rod of considerable diameter we prefer to build it up of a number of wires so as to lessen the eddy currents induced.

Sometimes as has heretofore been suggested we use more than one transmitter at each side of the vessel electrically connected in any suitable manner. By so doing it is possible with transmitters made according to this invention to increase the sound heard in the receiving telephone because a number of them can be made alike, and consequently if these are acoustically connected in the same way to places on the side of the vessel which are all in the same phase of vibration or nearly so at each instance the currents induced in the coils of all the transmitters will also all be in the same phase and therefore when compounded together will at every instant all act on the diaphragm of the receiving telephone in the same direction and thus increase the intensity of the sound heard in it. Whereas when carbon transmitters are similarly placed the carbon transmitters themselves introduced phase differences because of the inequalities and dissimilarities in them which cannot be got rid of and therefore when the current variations produced by a number of such transmitters are compounded together the current variations will not all act at every instant on the diaphragm of the receiving telephone in the same direction thus the intensity of the sound heard may be either increased or decreased from instant to instant.

Figure 1 is a longitudinal section of a transmitter made according to this invention bolted to the side of a vessel (below the water line). Fig. 2 is an end elevation of the transmitter shown in Fig. 1 as seen when looking toward the side of the vessel the end of the case being removed. Fig. 3 shows diagrammatically two of our transmitters with the arrangement of circuits which has hitherto been employed with other transmitters and Fig. 4 shows the arrangement of circuits it is preferred to employ. Fig. 5 is a side elevation and Fig. 6 a section on the line 6—6, Fig. 5, of an alternative method of attaching the transmitter to the side of a vessel. Fig. 7 is a longitudinal section of a third method of attachment. Fig. 8 is an elevation of an alternative method of supporting the mass. Fig. 9 shows diagrammatically the electrical connections between four transmitters fixed in close proximity to each other.

Referring to Figs. 1 and 2:—1 is a nickel rod 19 centimeters long and 2.53 millimeters in diameter prepared by having been heated to a bright red heat and cooled. 2 is a coil of single silk covered copper wire .175 mm. in diameter of 2700 turns wound in four layers on the nickel rod. 3 is a cylindrical brass mass 2.1 cm. long and 2.54 cm. in diameter. 4 is a radial slot in the brass mass to lessen the eddy currents induced in it. The weight of the mass is about 90 grams. The ends of the nickel rod are silver soldered to the mass 3 and to an iron disk 5 which is 2 mm. thick and 8.3 cm. in diameter. The disk 5 is attached by three screws 6 to the flange 7 at the end of the cylindrical case 8 which should be light and preferably made of non-conducting material such as hard fiber the other end of which is closed by a plug 9 of the same material. The mass 3 is supported by three radial sets of copper wires 10 there being three wires of .1 mm. in diameter in each set. One end of each of these wires is soldered to a boss 11, 3 mm. long and 3 mm. in diameter, projecting from the mass; the other ends pass through holes 12 in the case to the outside of which they are securely fixed by cement 13. The ends of the wire of the coil 2 on the nickel rod are taken out through holes in the case and are connected to a telephone 14 in circuit with a battery 15 and switch 16.

In Figs. 1 and 2 the disk 5 and with it the case 8 are fastened to the skin 17 of the vessel by means of three bolts 18. A mixture of pitch and castor oil is put between the disk 5 and the side of the vessel before the nuts on the bolts are screwed up so that on screwing them up tightly a thin layer 19 may be formed between the disk and the side of the vessel. This mixture is made by heating and stirring together two parts of pitch with one part of castor oil by weight.

The instrument above described is well adapted to receive a note having about 1200 vibrations per second. In other cases assuming that the mass of the rod and coil wound on it is small in comparison with the magnitude of the mass, the best magnitude of the mass is given approximately by the formula $$M = qA/4\pi^2 n^2 l$$

in which M is the magnitude of the mass, $l$ the length of the rod, A the area of cross section of the rod, $q$ Young's modulus for the material of the rod, all expressed in centimeter gram second absolute units and $n$ is the number of vibrations per second of the note with which the system is to be resonant.

The coil of wire 2 described above has been found to be suitable for use with an ordinary double pole receiving telephone having a resistance of about 70 ohms when there is a battery of about 6 volts in series with the coil and the receiving telephone.

Figs. 5 and 6 show a means of attachment of the nickel rod to a rib 20 of the vessel. 1 is the nickel rod. 21 is a small flat metal piece to which nickel rod is fixed. 22 is a bolt passing through a hole in the metal piece 21 and rib 20 clamping the two tightly together. 17 is the skin of the vessel.

Fig. 7 shows another means of attachment of the nickel rod 1 to the skin 17 of the vessel. 1 is the nickel rod. 23 is a small circular metal disk through which the nickel rod passes and projects slightly. It is silver soldered (or otherwise firmly fixed) to the disk. The disk is recessed around the edge. Into the recess a metal ring 24 fits. By means of bolts 25 (screwed into the skin 17) and nuts the ring 24 is tightly pressed on the disk 23 which tightly squeezes the projecting end of the nickel rod against the skin 17. In this way direct acoustical connection between the nickel rod and the skin is obtained.

When two instruments like the one described and shown in Figs. 1 and 2 are fastened to the sides of a vessel in any of the ways described their coils 2 are usually connected (as shown at Fig. 3) successively in series with the battery 15 and receiving telephone 14 by some convenient switch such as 25× so as to enable a listener to compare the sound produced in the receiving telephone when it and the battery are connected with the transmitter on one side with the sound produced when they are connected with the transmitter on the other side. In this case we prefer that the impedance of the coil on the nickel wire for an alternating current of the frequency of the note for which the instrument is best adapted should be the same as the impedance of the receiving telephone and its connecting wires. It is to be observed both that the impedance of the coil varies with the degree of magnetization of the nickel rod and therefore with the amount of the battery current which is passing through the coil and also that the variations of current produced by the changes of stress in the nickel rod depend on the degree of magnetization of the nickel rod, these variations of current being small either when the nickel rod is very slightly magnetized or when it is very strongly magnetized there being an intermediate amount of magnetization with which these variations of current are greatest. In order therefore to obtain the best results we prefer to make not only the impedance of the coil the same as that of the receiving telephone and its connecting wires but also the amount of magnetization of the nickel rod that which by experiment has been found to be the best. In order to insure that the two rods or wires are equally magnetized the arrangement of circuits shown at Fig. 4 is preferably adopted. 17, 17 are the two sides of a vessel with two similar transmitters made according to this invention attached thereto. Around each of the nickel rods of these two transmitters there are two coils of wire 2 and 26, the coils 2 and 26 being respectively similar to each other. In the figure these coils are shown diagrammatically on different parts of each nickel rod but in practice it is preferred to put the coils 26 over the coils 2. The coils 26 are connected in series with each other and a battery 27 and a choking coil 28 and a switch 29 by means of which the circuit may be conveniently closed and opened. The other coils 2 are connected alternately with the telephone receiver 14 by means of the switch 25× as above described. We prefer to make the choking coil 28 of so great an inductance that the variable current produced in the magnetizing coil 26 around one rod 1 by the variations of stress in the other rod is so small that these variations of stress do not cause a sound to be heard in the receiving telephone when it is connected with the coil 2 around the first rod.

Fig. 8 shows how the mass 3 may be supported by layers of sound insulating material such as felt. 3 is the mass. 30 are layers of felt between the mass 3 and the case 8. 7 is the flange of the case.

Fig. 9 illustrates diagrammatically how four similar transmitters fixed near each other may be electrically connected together so as to increase the sound heard. 31, 32, 33 and 34 are four similar transmitters attached to places on the side of the vessel which are in the same or nearly the same phase of vibration. One pair 31 and 32 are connected in series and the other pair 33 and 34 are also connected in series: and the two pairs are connected in parallel. In this way the resistance and inductance and consequently the impedance of the connected group of transmitters are the same as the resistance, inductance and impedance of one of them when equally magnetized. While the variations in the magnetization of the nickel rods being the same in each the variation of electromotive force at the terminals of the connected group is double the variation of electromotive force at the terminals of one of them. Thus the variations of the current in the circuit will be doubled.

What we claim is:—

1. In apparatus for receiving submarine sounds, the combination of a magnetized rod, means for connecting one end of the rod to the side of a vessel, a mass fixed to the other end of the rod, and means for detecting variations in the magnetism of the rod.

2. In apparatus for receiving submarine sounds, the combination of a magnetized nickel rod, means for connecting one end of the rod to the side of a vessel, a mass fixed to the other end of the rod, and means for detecting variations in the magnetism of the rod.

3. In apparatus for receiving submarine sounds, the combination of a magnetized rod, means for connecting one end of the rod to the side of a vessel, a mass fixed to the other end of the rod of such magnitude as to put the system into resonance with the sound to be received, and means for detecting variations in the magnetism of the rod.

4. In apparatus for receiving submarine sounds, the combination of a magnetized nickel rod, means for connecting one end of the rod to the side of a vessel, a mass fixed to the other end of the rod of such magnitude as to put the system into resonance with the sound to be received, and means for detecting variations in the magnetism of the rod.

5. In apparatus for receiving submarine sounds, the combination of a magnetized rod, a plate fixed to one end of the rod, means for fixing the plate to the side of a vessel, a layer of plastic material interposed between the plate and the side, a mass fixed to the other end of the rod, a coil surrounding the rod, and means for detecting variations of current in the coil.

6. In apparatus for receiving submarine sounds, the combination of a magnetized nickel rod, a plate fixed to one end of the rod, means for fixing the plate to the side of a vessel, a layer of plastic material interposed between the plate and the side, a mass fixed to the other end of the rod, a coil surrounding the rod, and means for detecting variations of current in the coil.

7. In apparatus for receiving submarine sounds, the combination of a magnetized rod, a plate fixed to one end of the rod, means for fixing the plate to the side of a vessel, a layer of plastic material interposed between the plate and the side, a mass fixed to the other end of the rod of such magnitude as to put the system into resonance with the sound to be received, a coil surrounding the rod, and means for detecting variations of current in the coil.

8. In apparatus for receiving submarine sounds, the combination of a magnetized nickel rod, a plate fixed to one end of the rod, means for fixing the plate to the side of a vessel, a layer of plastic material interposed between the plate and the side, a mass fixed to the other end of the rod of such magnitude as to put the system into resonance with the sound to be received, a coil surrounding the rod, and means for detecting variations of current in the coil.

9. In apparatus for receiving submarine sounds, the combination of a magnetized rod, means for connecting one end of the rod to the side of a vessel, a mass fixed to the other end of the rod, a coil surrounding the rod, and a telephone in circuit with the coil.

10. In apparatus for receiving submarine sounds, the combination of a magnetized nickel rod, means for connecting one end of the rod to the side of a vessel, a mass fixed to the other end of the rod, a coil surrounding the rod, and a telephone in circuit with the coil.

11. In apparatus for receiving submarine sounds, the combination of a magnetized rod, means for connecting one end of the rod to the side of a vessel, a mass fixed to the other end of the rod of such magnitude as to put the system into resonance with the sound to be received, a coil surrounding the rod, and a telephone in circuit with the coil.

12. In apparatus for receiving submarine sounds, the combination of a magnetized nickel rod, means for connecting one end of the rod to the side of a vessel, a mass fixed to the other end of the rod of such magnitude as to put the system into resonance with the sound to be received, a coil surrounding the rod, and a telephone in circuit with the coil.

13. In apparatus for receiving submarine sounds, the combination of a magnetized rod, a plate fixed to one end of the rod, means for fixing the plate to the side of a vessel, a layer of plastic material interposed between the plate and the side, a mass fixed to the other end of the rod, a coil surrounding the rod, and a telephone in circuit with the coil.

14. In apparatus for receiving submarine sounds, the combination of a magnetized nickel rod, a plate fixed to one end of the rod, means for fixing the plate to the side of a vessel, a layer of plastic material interposed between the plate and the side, a mass fixed to the other end of the rod, a coil surrounding the rod, and a telephone in circuit with the coil.

15. In apparatus for receiving submarine sounds, the combination of a magnetized rod, a plate fixed to one end of the rod, means for fixing the plate to the side of a vessel, a layer of plastic material interposed between the plate and the side, a mass fixed to the other end of the rod of such magnitude as to put the system into resonance with the sound to be received, a coil surrounding the rod, and a telephone in circuit with the coil.

16. In apparatus for receiving submarine sounds, the combination of a magnetized nickel rod, a plate fixed to one end of the rod, means for fixing the plate to the side of a vessel, a layer of plastic material interposed between the plate and the side, a mass fixed to the other end of the rod of such magnitude as to put the system into resonance with the sound to be received, a coil surrounding the rod, and a telephone in circuit with the coil.

17. In apparatus for receiving submarine sounds, the combination of a pair of similar rods of magnetic material, means for connecting one end of each rod to the side of a vessel similar coils surrounding the rods, a battery and a choking coil in circuit with the coils, and means for detecting variations in the magnetism of the rods.

18. In apparatus for receiving submarine sounds, the combination of a pair of similar rods of magnetic material, means for connecting one end of each rod to the side of a vessel similar coils surrounding the rods, a battery and a choking coil in circuit with the coils, a second pair of coils similar to each other surrounding the rods, and means for putting a telephone into circuit with each of the latter coils.

THOMAS ALEXANDER GARRETT.
WILLIAM LUCAS.

Witnesses:
H. D. JAMESON,
F. L. RAND.